Figure 1:
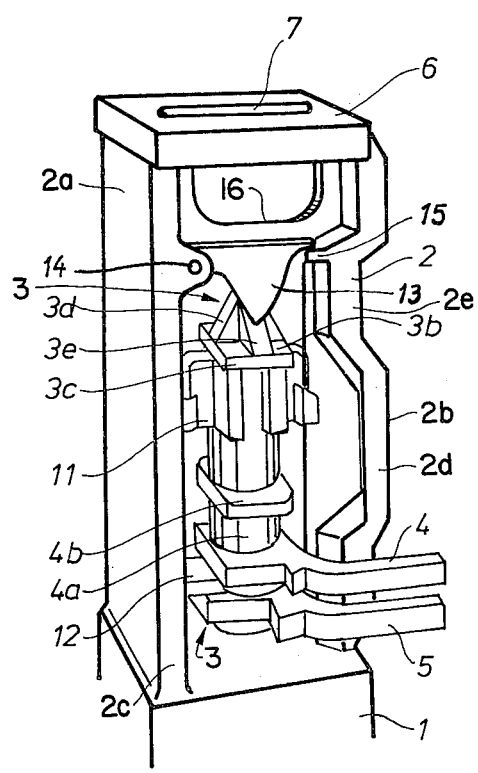

United States Patent [19] [11] 4,437,211
Dorpmund [45] Mar. 20, 1984

[54] DEVICE FOR LOCKING TOGETHER STACKED OBJECTS

[75] Inventor: Willi Dorpmund, Elze, Fed. Rep. of Germany

[73] Assignee: Graaff KG, Elze, Fed. Rep. of Germany

[21] Appl. No.: 279,488

[22] Filed: Jun. 1, 1981

Related U.S. Application Data

[63] Continuation-in-part of Ser. No. 114,543, Jan. 23, 1980, abandoned.

[30] Foreign Application Priority Data

Jul. 5, 1979 [DE] Fed. Rep. of Germany ....... 2927231

[51] Int. Cl.³ .............................................. A44B 21/00
[52] U.S. Cl. ........................................ 24/287; 410/82; 410/83; 24/592
[58] Field of Search ....................... 24/221 R, 287, 219, 24/220, 221 K, 208 R, 212, 221 A; 410/82, 83

[56] References Cited

U.S. PATENT DOCUMENTS

| | | | |
|---|---|---|---|
| 3,521,845 | 7/1970 | Sweda et al. | 410/83 |
| 3,593,387 | 7/1971 | Georgi | 24/287 |
| 3,618,999 | 11/1971 | Hlinsky | 410/83 |
| 3,643,906 | 2/1972 | Werner et al. | 24/221 R |
| 3,682,423 | 8/1972 | Scarborough | 410/83 |
| 3,753,272 | 8/1973 | Laidley | 24/287 |
| 3,872,555 | 3/1975 | Link et al. | 24/221 R |
| 3,924,544 | 12/1975 | Grau et al. | 24/221 R |
| 4,321,000 | 3/1982 | Novak | 410/82 |

FOREIGN PATENT DOCUMENTS

| | | | |
|---|---|---|---|
| 1245535 | 9/1971 | United Kingdom | 410/82 |
| 1395506 | 5/1975 | United Kingdom | 410/83 |

*Primary Examiner*—Robert A. Hafer
*Assistant Examiner*—Paul S. Polakowski
*Attorney, Agent, or Firm*—Alan H. Levine

[57] ABSTRACT

A device for locking together two stacked objects, each having a plate with an opening, the plates being in superposed relation and the openings being in registry. The device includes a housing, the top wall of which is the plate of the lower object. A bolt, movable vertically and rotatably within the housing, having a head piece shaped to pass through the plate openings when the bolt is in a first angular orientation but not when the bolt is in a second angular orientation. A structural unit, movable vertically with the bolt and rotatable with respect to it, has a supporting shoulder which does not engage a support surface in the housing when the unit is in a first angular orientation but does engage the surface when the bolt is in a second angular orientation. A pair of levers are used to simultaneously raise the bolt and structural unit so that the bolt head piece passes through the plate opening; with one lever the structural unit is then rotated so that its shoulder rests on the support surface in the housing, and with the other lever the bolt is rotated so that it does not pass through the registered openings in the plates. A pawl prevents accidental rotation of the levers in a direction which would unlock the objects.

7 Claims, 4 Drawing Figures

DEVICE FOR LOCKING TOGETHER STACKED OBJECTS

This application is a continuation-in-part of copending application Ser. No. 114,543, filed Jan. 23, 1980 now abandoned.

In container operations, it is a well known and customary procedure to set down, even large containers, not only next to one another, but also to stack them on top of one another. For this purpose, the containers have corner columns of adequate stiffness in compression, so that the weight of an upper container it transmitted through its corner columns to the corner columns of a container below and through these to a bearing surface or to a container further below.

If several large containers are stacked one on top of the other in this manner, they must be secured in such a way that they do not slip relative to one another in the horizontal direction. This is necessary in every storage area, but is particularly important when several containers are stacked one on top of the other during transport, for example, by ship. This safeguard must be very strong, because the motion loaded containers are subjected to when transported can produce considerable relative horizontal forces between the containers. Horizontal slippage of the containers relative to one another due to these forces can cause immeasurable damage and lead, for example, to the sinking of a ship.

On the other hand, it is important that the means employed for preventing the slippage of containers relative to one another are not only reliable, but also simple to apply and to disassemble. The reason is that container operations are carried out from the point of view that rapid transshipment of goods is paramount, and this objective conflicts with any delay resulting from securing and releasing the safety device which prevents slippage of the containers relative to each other.

It is, therefore, an object of the invention to provide a safety device with which containers, even those stacked on top of each other and especially large containers, can be secured rapidly and reliably relative to one another, the device being releasable again equally rapidly and without difficulty in order to be able to remove the containers from the stack. At the same time, the operation of the safety device not only saves time and proceeds without difficulty, but it is also possible for one attendant to carry out this operation manually, that is, without requiring tools, machines, or other aids.

A device in accordance with the invention can be provided without difficulty to each container. It is strong and well suited to rough container operations. It can be operated rapidly and without aids by one attendant, who does not require special training; a simple instruction sheet is sufficient for transmitting the necessary information. Finally, the device is absolutely reliable and prevents undesirable free motion between two containers stacked one upon the other, either in the vertical direction or, especially, in the horizontal direction. This effect is independent of the length of time the device has been in operation.

Relatively low containers, or so-called "flats" (simple platforms), can be stacked on top of one another up to a unit height, forming a block or a package. Such a package can then be grasped, lifted and loaded by a lifting appliance in the same manner as a standard large container of the same dimensions as the package.

For the purpose of better understanding, an example of the operation of the invention is described in the following drawings. In FIGS. 1 to 4, the example of the invention is shown in perspective in four different operating positions.

An open housing 2 is placed on each of the four corner columns 1 of a large container which can be stacked. Housing 2 has side walls 2a and 2b, each of which has a front edge 2c and 2d, respectively. Front edge 2d is formed with two recessed pockets 2e and 2f. In the housing 2, a bolt 3 is mounted rotatably about its vertical longitudinal axis and is displaceable in the direction of the vertical longitudinal axis. The bolt has a vertical shaft and a head piece 3b. The head piece consists of a rectangular horizontal plate 3c, on which two vertical plates 3d and 3e, which cross each other, are mounted. The vertical plates 3d and 3e converge upwardly so as to form a peak 3f above the center of the horizontal plate 3c.

A lever 4, together with a sleeve 4a and a supporting shoulder 4b, forms a structural unit which surrounds the bolt shaft, the longitudinal axis of the sleeve 4a being colinear with the longitudinal axis of the bolt shaft. The structural unit 4, 4a, 4b can be pivoted about the longitudinal axis of the bolt shaft, as is evident from its different positions in FIGS. 1 to 4. A second lever 5, with which the bolt 3 can be pivoted about the longitudinal axis of the bolt shaft, is connected to the lower end of the bolt shaft. A supporting disk 12, positioned on the bolt shaft and mounted between the levers 4 and 5, aids the pivotal guidance of the lower end of bolt 3 in housing 2. Directly below the head 3b of the bolt, a structural part 11 positioned on the shaft of the bolt also aids the pivotal guidance of bolt 3 in housing 2. A pawl 13 is mounted on the housing 2 near its upper end. At one of its sides, pawl 13 can be pivoted about a horizontal cross pin 14, while on the opposite side it is supported, when it is in its position of rest, on a projection 15 of housing 2.

At its upper end, housing 2 is covered by a plate 6, in which there is a rectangular opening 7. The cross-sectional dimensions of opening 7 are similar to those of the surface area of the horizontal plate 3c, so that the bolt 3 and the horizontal plate 3c can pass through opening 7.

In the lowermost position of bolt 3 (FIG. 1), the position of horizontal plate 3c is such that the longer axis of its rectangular shape is perpendicular to the longer axis of opening 7. If the bolt 3 is to be moved upwardly, it is first pivoted about its longitudinal axis such that the longer axes of the opening 7 and of horizontal plate 3c are parallel to each other, so that bolt 3 with plate 3c can pass through opening 7. When bolt 3 with plate 3c has been passed upwardly through opening 7, by a predetermined amount, bolt 3 is once again pivoted about its longitudinal axis, so that the longer axes of the rectangles of opening 7 and plate 3c are once again perpendicular to each other (see FIG. 4).

The conditions under which the bolt 3 and its plate 3c must be passed through the opening 7 will now be described. A container 8, which is to be stacked on a container previously set down, has at the lower ends of its corner columns 9 a plate 10. Plate 10 corresponds to the horizontal portion of plate 6, and has an opening equal in arrangement and size to opening 7. In the case of containers standing on top of each other, bolt 3 is lifted far enough so that it passes through opening 7 and through the corresponding opening the lower end of the column of the container above. When the bolt and its plate 3c has passed through the opening at the lower end of the respective column of the upper container, and has been rotated by 90° about its longitudinal axis, the bolt and the plate 3c rests upon the plate of the lower end of the column of the upper container whereby both containers are mutually locked. In order to lift the upper container from the lower container, this locking device is released in a appropriate manner.

Following is a detailed description of the situation existing during the operation of the locking device according to the present invention.

The initial position of the locking device is the position shown in FIG. 1. The bolt 3, including the bolt shaft and the head piece 3b at the upper end thereof, and the lever 5 at the lower end of the bolt shaft, as well as the structural part 11 and the supporting disk 12, and the structural unit including the lever 4, the sleeve 4a, and the supporting shoulder 4b, are in their lowermost positions. Both levers 4 and 5 are pivoted sidewards into pocket 2f. The longitudinal sides of the plate 3c and of the supporting shoulder 4b are parallel to each other and perpendicular to the longitudinal sides of the opening 7.

Figure 2:
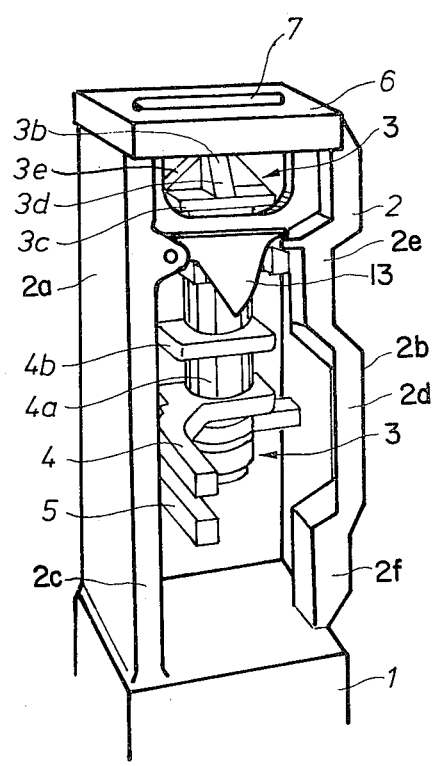
Figure 3:
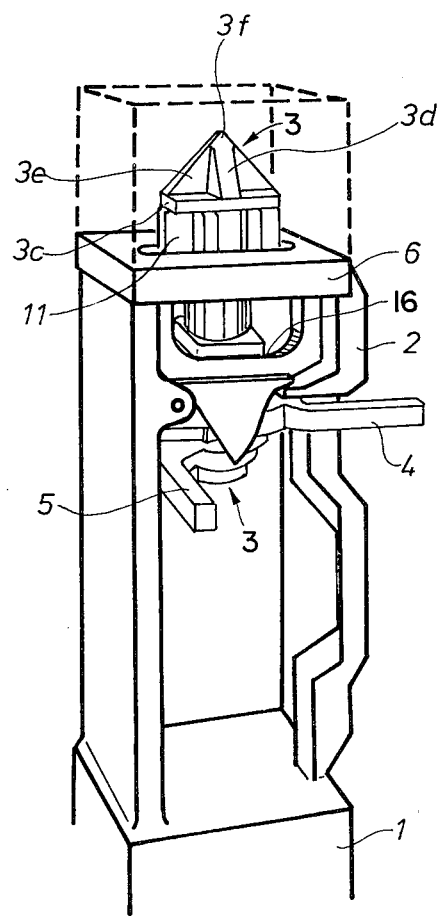

For lifting, levers 4 and 5 are moved into the position shown in FIG. 2, i.e., the bolt 3 and the structural unit, 4, 4a, 4b are rotated by 90°, but the structrual part 11 and the supporting disk 12 maintain their position since they are guided on vertical guiding means of the housing 2 in a non-rotatable but vertically adjustable manner. When the levers 4 and 5 are pivoted into the position shown in FIG. 2, wherein they extend outwardly beyond the front edges 2c and 2d of housing walls 2a and 2b, the longitudinal sides of the plate 3c and the supporting shoulder are parallel to the longitudinal sides of the slit 7. Therefore, all three components, i.e., the bolt 3 comprising the bolt shaft, the head piece 3b and the lever 5, the structural part 11 and the supporting disk 12, and the structural unit comprising the lever 4, the sleeve 4a, and the supporting shoulder 4b, can be lifted vertically until the head piece 3b of the bolt 3 has passed through the opening 7. Thereupon the structural unit including sleeve 4a and shoulder 4b is pivoted by lever 4 through 90° so that the support shoulder 4b is also pivoted through 90° (FIG. 3). After this pivoting movement, the support shoulder 4b rests upon a supporting surface 16 in the housing 2 and maintains the three parts 3, 11 and 12, as well as unit 4a, 4, and 4b in the upper position. During turning of lever 4 into the position shown in FIG. 3, the lever engages and slides along the lower left inclined edge of pawl 13 to lift the pawl out of the way.

Once the position shown in FIG. 3 is reached, a container 8 can be stacked. The container is provided at each of the lower ends of its corner posts with a container column 9 provided at its bottom with a plate 10 which surrounds an opening corresponding exactly to opening 7. The container can be lowered until the plate 10 rest on top of plate 6, the head piece 3b having passed through the slit in the plate 10, and plate 10 now rests underneath plate 3c of the head piece 3b (FIG. 3). Thereupon, lever 5 is pivoted to a position underneath lever 4 (FIG. 4), lifting pawl 13 out of the way during its travel. In this position, both levers 4 and 5 are in pocket 2e. As a result, bolt 3 is rotated in its entirety through 90° so that the longitudinal sides of plate 3c of the head piece 3b are perpendicular to the longitudinal sides of the openings in the plates 6 and 10. Hence the two containers are locked together, and when the upper container is lifted with a crane, the upper container takes the lower container along with it due to the device according to the invention.

Figure 4:
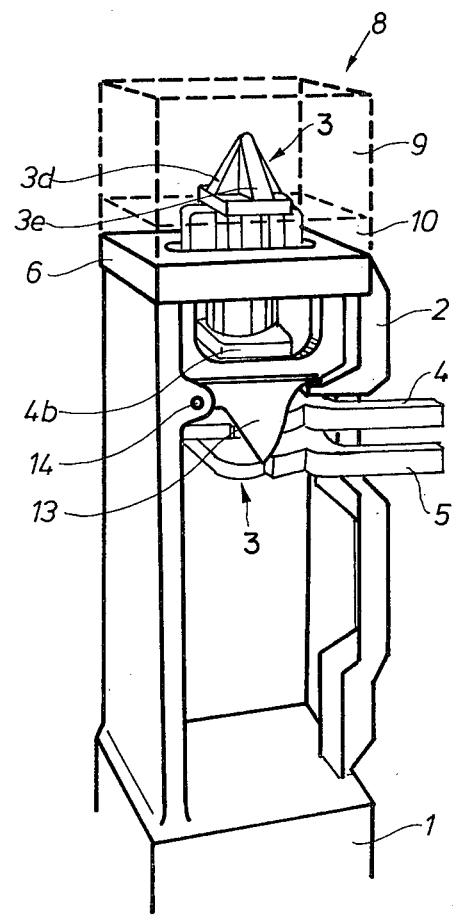

The separation of the two containers from one another is effected by reversing the sequence of steps just described, beginning with the position shown in FIG. 4. However, before either lever 4 or 5 can be pivoted, pawl 13 must be lifted out of the way. Pawl 13 prevents accidental return pivotal movement of levers 4 and 5 so as to prevent inadvertent separation of the locked-together containers.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A device for locking together two stacked objects, the lower object having a plate at its upper end and the upper object having a plate at its lower end, the two plates being in superposed relation when the objects are stacked and each plate having a non-circular opening identical to and in registry with the opening in the other plate, the locking device comprising:
    (a) a housing, the top wall of the housing being the plate of the lower object, the housing having a support surface within it and two side walls, each side wall having a front edge and one of the front edges having two pockets,
    (b) a bolt within the housing movable vertically and rotatably with respect to the housing, the bolt having a head piece shaped to pass through the plate openings when the bolt is in a first angular orientation but not when the bolt is in a second angular orientation,
    (c) a structural unit coaxial with the bolt and movable vertically with the bolt, the structural unit being rotatable with respect to the bolt and to the housing and having a supporting shoulder which does not engage the support surface of the housing when the structural unit is in a first angular orientation but does engage the support surface when the structural unit is in a second angular orientation,
    (d) two levers for simultaneously moving the bolt and structural unit vertically between extreme upper and lower positions, movement of the bolt and structural unit upwardly while they are in their first angular orientations passing the bolt head piece through the opening in the plate of the lower object and elevating the supporting shoulder above the housing support surface, one of said levers being arranged to rotate the structural unit to its second angular orientation so that the supporting shoulder engages the housing support surface to maintain the structural unit and bolt in their raised positions, and the other of said levers being arranged to rotate the bolt to its second angular orientation, after an upper object is stacked on the lower object with the bolt head piece passing the opening in the plate of the upper object, so as to lock the two objects together, and
    (e) the two levers extending out of the housing between the side walls thereof during vertical movement of the bolt and structural unit, both levers being located with each of the two pockets in the housing when the bolt and structural unit are in each of their two extreme positions, respectively, and also in their second angular orientations.

2. A device for locking together two stacked objects as defined in claim 1 including support means movable vertically, but not rotatably, within the housing, the bolt and structural unit being rotatably mounted within said support means.

3. A device for locking together two stacked objects as defined in claim 2 wherein said support means includes a part located between the bolt head piece and the structural unit.

4. A device for locking together two stacked objects as defined in claim 2 wherein said support means includes a part located between the structural unit and the means for moving the bolt and structural unit.

5. A device for locking together two stacked objects as defined in claim 1 wherein the bolt head piece tapers upwardly and inwardly at its upper end.

6. A device for locking together two stacked objects as defined in claim 1 including means carried by the housing for preventing accidental pivotal movement of the bolt and structural unit from their second positions to their first positions.

7. A device for locking together two stacked objects as defined in claim 6 wherein the preventing means includes a pawl arranged in the path of movement of the means for moving the bolt and structural unit when those parts are in their raised positions.

* * * * *